United States Patent

Gerson

[11] 4,105,219
[45] Aug. 8, 1978

[54] POSITIVE LOCKING DEVICE FOR BOAT TRAILER BOLSTER BRACKET

[76] Inventor: Fred B. Gerson, c/o Hub City Machine & Tool Co., 408 Sterling St., Jackson, Tenn. 38301

[21] Appl. No.: 786,654

[22] Filed: Apr. 11, 1977

[51] Int. Cl.² .............................................. B60P 3/10
[52] U.S. Cl. .................................. 280/789; 248/228; 280/414 R
[58] Field of Search ...................... 280/414 R, 106 T; 248/228, 295 A, 295 R, 298; 9/1.2

[56] References Cited
U.S. PATENT DOCUMENTS 3,122,245  2/1964  MacKusick et al. ............ 280/414 R
3,403,798  10/1968  Flachbarth et al. ............ 280/414 R Primary Examiner—Joseph F. Peters, Jr.
Assistant Examiner—Donn McGiehan
Attorney, Agent, or Firm—Harrington A. Lackey

[57] ABSTRACT

A bolster bracket for a boat trailer including an elongated vertical support member attached to the bolster and having an elongated slot receiving a U-bolt encompassing the transverse channel frame member of the trailer, and having a plurality of vertically spaced locking holes through the support member, any one of which receives a stop pin member for engaging the top surface of one of the flanges of the transverse frame member, to positively lock the bolster bracket in a vertically adjusted position.

2 Claims, 4 Drawing Figures

POSITIVE LOCKING DEVICE FOR BOAT TRAILER BOLSTER BRACKET

BACKGROUND OF THE INVENTION

This invention relates to a boat trailer, and more particularly to a bolster bracket for a boat trailer.

A typical boat trailer includes an open frame or chassis made from structural steel channel members, including steel channel cross or transverse frame members. Elongated, padded bolsters are mounted upon, and above, the transverse channel frame members by an elongated vertical support bracket, the top end of which is preferably pivoted or swivelly connected to the bottom of each bolster. Each support bracket is provided with an elongated vertical central slot receiving a U-bolt extending around, or encompassing, a cross-sectional portion of the transverse frame member and secured in place by a pair of nuts.

However, because of the weight of the boat upon the bolsters, and the constant vibration of the boat trailer in transit, the frictional engagement between the nuts of the U-bolt and the support bracket is oftentimes insufficient to prevent the brackets from slipping upon the surface of the transverse frame member. Accordingly, one or more of the bolsters, or one end portion of a bolster, is lowered relative to the other bolsters or bolster portions, automatically lowering that portion of the supported boat, so that the boat is carried in an unbalanced or tilted attitude.

Attempts have been made to minimize or eliminate the accidental slipping of the support bracket upon the transverse frame member, by inserting high frictional washers, or washers having claws projecting therefrom, between the nuts and the corresponding threaded legs of the U-bolt, so that the highly frictional washer surfaces will more firmly grip, or bite into the surface of the upright support member or bracket. However, even high frictional washer surfaces and washer claws eventually wear to lessen their gripping and holding effectiveness.

SUMMARY OF THE INVENTION

It is therefore an object of this invention to provide a positive locking device for holding a bolster bracket upon the transverse channel frame member of a boat trailer.

The bolster bracket made in accordance with this invention includes an upright support member, which is usually channel-shaped, having a vertically disposed web or plate portion through the central portion of which is formed a longitudinally extending slot having a length substantially longer than the height of the transverse frame member. This central elongated slot receives a U-bolt member, encompassing a cross-sectional portion of the transverse frame member and secured in place by nuts threadedly engaging the legs of the U-bolt.

The upright support bracket or member further includes a plurality of vertically spaced locking holes formed in the web portion of the bracket member, on either or both sides of the central elongated slot. These locking holes are adapted to assume various locking positions above and adjacent to the top surface of either flange of the transverse channel frame member. A locking pin member, preferably in the form of a stop bolt and nut is inserted into one of the locking holes in a locking position, so that the pin member, extending through the locking hole, engages the top surface of one of the flanges of the transverse channel frame member. Thus, the stop pin member positively engaging the top surface of one of the flanges of the transverse frame member presents a positive barrier or stop to prevent any downward slipping of the bolster or bolster bracket relative to the transverse frame member, occasioned by the weight of the boat, the jarring and vibration of the boat or boat trailer in transit, or other normally experienced forces exerting downward pressure upon the bolster brackets.

DESCRIPTION OF THE PREFERRED EMBODIMENT

Figure 1:
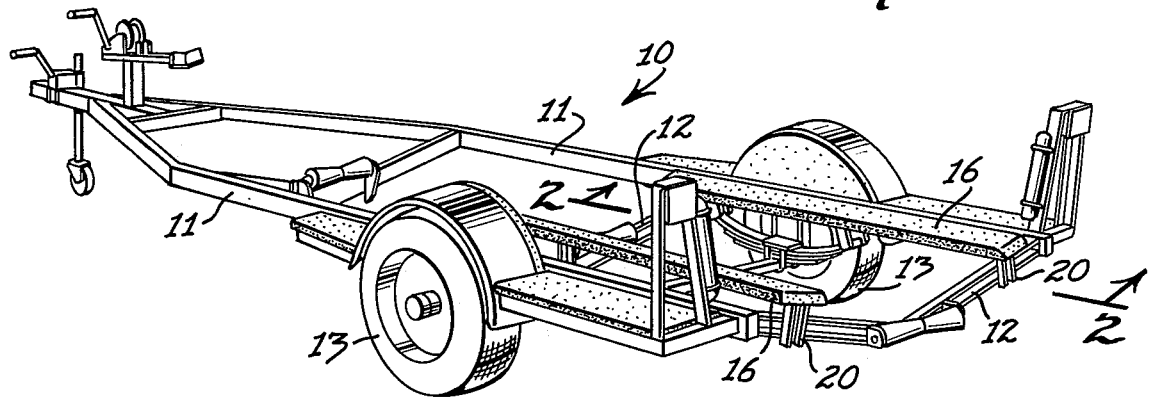
FIG. 1 is a top, rear, perspective view of a conventional boat trailer, including bolster brackets made in accordance with this invention.

Referring now to the drawings in more detail, FIG. 1 discloses a typical boat trailer 10 having elongated side frame members 11 and transverse or cross frame members, such as the rear transverse channel frame members 12, all supported by wheels 13.

The trailer 10 includes a pair of elongated bolsters 15 encased in padded covering 16 to form a cradle support for the bottom of the boat 17.

Secured to the front and rear portions of the bottom surface of each bolster 15 is an angle-shaped swivel bracket 18, which is pivotally or swivelly secured by a swivel pin or bolt 19 to the upper or top end portion of a support member or support bracket 20.

The support member 20 is preferably an elongated piece of steel channel having a plate or web portion 21 and a pair of flanges 22, providing stiffening reinforcing for the plate portion 21. The support member 20 is substantially longer than the height of the transverse frame member 12.

An elongated slot 24 is formed in the middle or central portion of the plate portion 21 of the support member 20, and the length of the slot 24 is also substantially longer than the height of the transverse channel frame member 12.

A U-bolt member 25 has its inner surface substantially the same size and shape as the outer surface of the transverse channel frame member 12, so that the U-bolt member 25 completely encompasses any cross-sectional portion of the frame member 12. The threaded legs 26 of the U-bolt member 25 extend through elongated slot 24 and are adapted to threadedly engage the respective nuts 27, which when tightened, force the washers 28 into firm frictional engagement with the surface of the plate portion 21, to hold the support bracket 20 securely against the transverse frame member 12.

The parts of the bolster bracket thus far described, are old in the art.

Because of the tendency of the washers 28 to slip, while engaging the face of the plate portion 21 of the upright support member 20, a positive locking device or feature has been added to the support member 20, in accordance with this invention, to prevent such slippage, and the undesired lowering of the bolsters 15, or any portions thereof.

Figure 2:
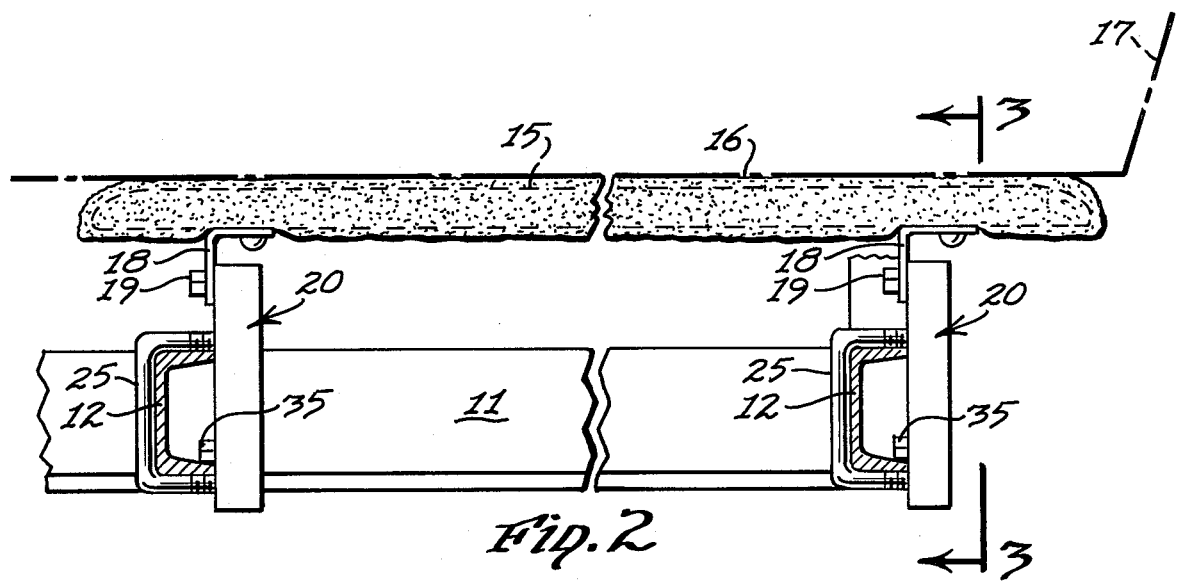
FIG. 2 is an enlarged, fragmentary section taken along the line 2—2 of FIG. 1, illustrating the position of the boat in phantom.

A plurality of vertically spaced locking holes 30 and 31 are formed in the plate portion 21 of the support member 20. As disclosed in FIG. 3, the vertically spaced holes 30 are in vertical alignment and arranged on one side, that is the left side, of the central elongated slot 24. On the opposite side of the slot 24 are the plurality of vertically spaced locking holes 31. It will be noted that the holes 30 and 31 are vertically staggered, and the holes 31 are preferably vertically staggered midway between the locking holes 30, to reduce the effective spatial increments between the locking positions provided by the holes 30 and 31. Each of the holes 30 and 31 is adapted to register in a locking position in which the hole 30 or 31 is spaced above, but adjacent to the top surface of either of the flanges 33 and 34 of the transverse frame member 12. Thus, when a hole 30 or 31 is in a locking position, such as the hole 30' in FIG. 4, a stop pin member in the form of a stop or locking bolt 35 may be inserted through the hole 30' and secured in the locking position by the nut 36, so that the bolt 35 rests upon the top surface of the lower flange 34, as illustrated in FIGS. 2 and 4

Thus, even if the washers 28 tend to slip against the surface of the face of the web portion 21, nevertheless the locking bolt 35 provides a positive stop, to prevent any slipping between the upright support member 20 and the corresponding transverse frame member 12.

The locking bolt 35 and its threadedly engaging nut 36 are made large and strong enough to withstand any force normally encountered by the bracket 20, whether it be the weight of the boat 17, or the repeated jarring and vibration experienced by the bolsters 15, the support member 20, or any other part of the boat trailer 10 in motion.

Figure 3:
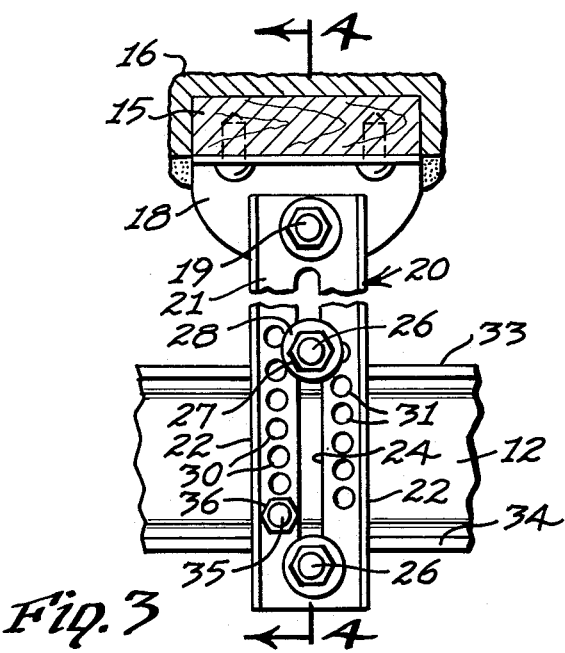
FIG. 3 is an enlarged, fragmentary section taken along the line 3—3 of FIG. 2.
Figure 4:
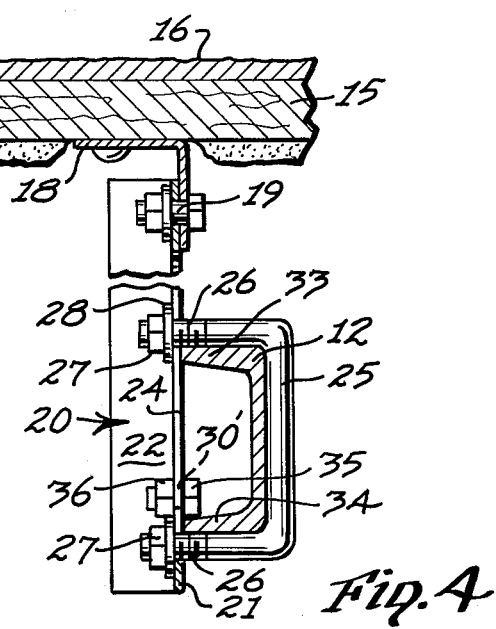
FIG. 4 is a fragmentary section taken along the line 4—4 of FIG. 3.

It will be understood that more or less locking holes 30 and 31 may be employed, than those disclosed in FIG. 3. Furthermore, it will be understood that only the holes 30 may be employed, without the holes 31, or vice versa.

It will be further understood that other types of locking or stop pin members may be employed than the stop bolts 35 and their corresponding nuts 36.

As illustrated in FIG. 3, the support member 20 is shown fragmented, to indicate that the support member 20, as well as its central elongated slot 24, may be substantially longer, in order to provide more vertically adjusted locking positions between the support member 20 and the transverse frame member 12.

What is claimed is:

1. In a boat trailer having a transverse channel frame member, and a bolster having a top boat-supporting surface and a bottom surface, a bolster mounting device comprising:
   (a) an elongated support member having a plate portion substantially longer than the height of said transverse frame member, and having a top portion and a bottom portion,
   (b) means attaching the top portion of said support member to the bottom surface of said bolster,
   (c) an elongated slot extending through the longitudinal central portion of said plate portion and having a length substantially greater than the height of said transverse member,
   (d) a U-bolt member encompassing a cross-sectional portion of the transverse frame member, having threaded end portions extending through said elongated slot, and including nuts engaging said threaded end portions and adapted to be tightened against said plate portion,
   (e) a plurality of vertically spaced locking holes in said plate portion, various holes of which are located in a locking position adjacent and above a flange on said transverse frame member for various vertically adjusted positions of said support member relative to said transverse frame member, and
   (f) a stop pin member inserted through one of said locking holes in a locking position in which said pin member rests upon the top surface of a flange of said transverse frame member.

2. The invention according to claim 1 in which said stop pin member is a stop bolt and a nut threadedly engaging said stop bolt.

* * * * *